(No Model.)
H. L. MOYER.
WHIFFLETREE.
No. 425,546. Patented Apr. 15, 1890.
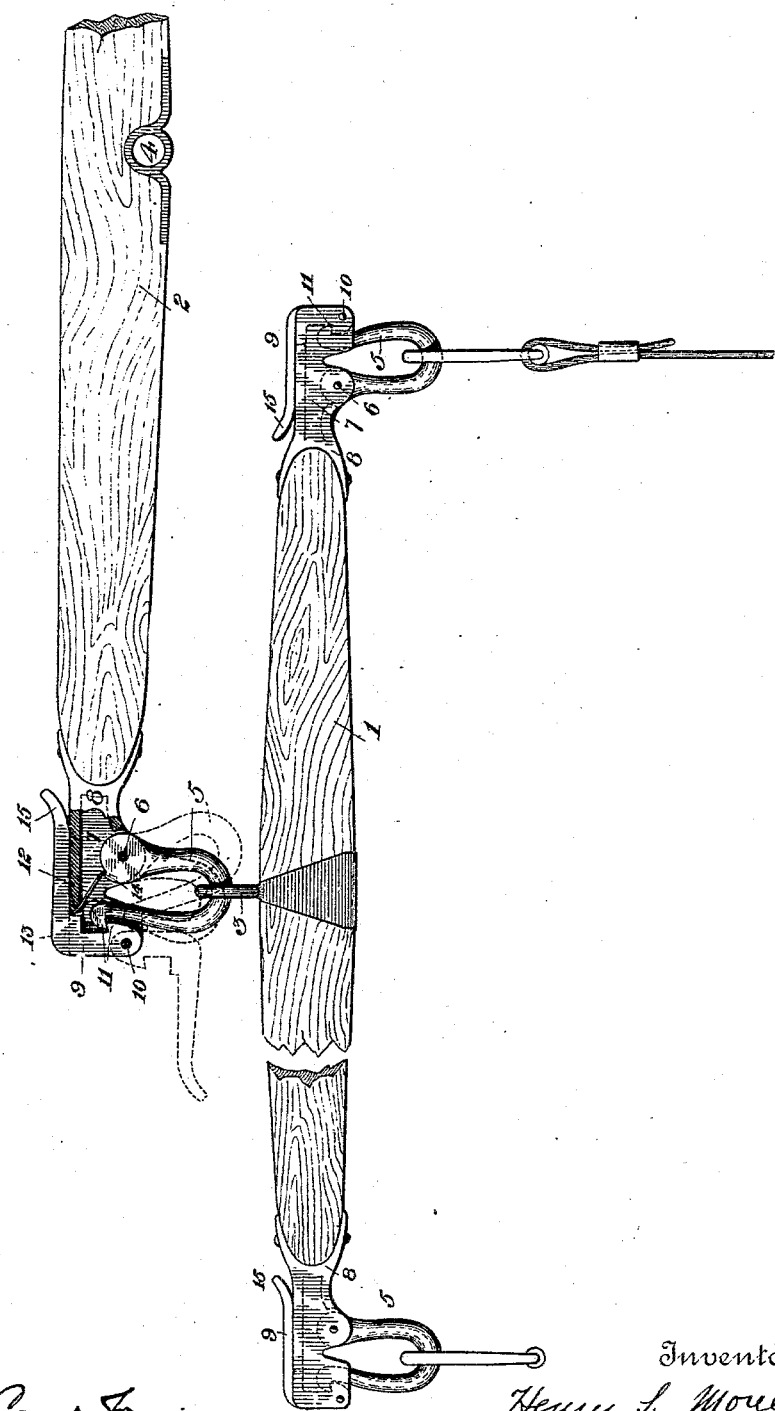
Witnesses
Lendell A. Connor Jr
Edward Cashman.
Inventor
Henry L. Moyer
By his Attorney.
Benj' R. Catlin

UNITED STATES PATENT OFFICE.

HENRY L. MOYER, OF SHICKSHINNY, PENNSYLVANIA, ASSIGNOR OF ONE-HALF TO ASHEL G. ROOD, OF SAME PLACE.

WHIFFLETREE.

SPECIFICATION forming part of Letters Patent No. 425,546, dated April 15, 1890.

Application filed October 4, 1889. Serial No. 326,055. (No model.)

*To all whom it may concern:*

Be it known that I, HENRY L. MOYER, a resident of Shickshinny, in the county of Luzerne and State of Pennsylvania, have invented certain new and useful Improvements in Whiffletrees; and I do hereby declare the following to be a full, clear, and exact description of the invention, such as will enable others skilled in the art to which it pertains to make and use the same.

The object of the invention is to provide a secure and convenient lock for a movable hook suitable for either a singletree or doubletree; and it consists in the devices hereinafter described and pointed out.

In the accompanying drawing, the figure is a perspective, partly in section, of the improved device.

The reference-figure 1 indicates the usual wooden part of a singletree, and 2 the like part of a doubletree, the front edge or side of each being, preferably, made straight, as represented, to secure the full strength of the stick. The rear side can be shaped on a curve, if desired, leaving the widest part at the center.

3 denotes a ring for attaching the singletree, and 4 a device secured to the rear of the doubletree provided with a hole to receive the usual bolt for connecting the same to a wagon or other object. This iron, shaped substantially as shown, furnishes a durable bearing for a fastening-bolt and by its lateral extensions supports the wood part of the doubletree to compensate for the cut in the wood made to receive the iron, the device as a whole not interfering with the general outline of the doubletree.

5 denotes a movable or swinging hook adapted to receive a tug-ring or the like. Said hook is hinged at 6 between two parts 7 7 of the iron 8, which is bolted or otherwise fastened to the wood in a secure manner. Said iron is recessed to receive the hook and also to receive a locking-lever 9, which is similarly pivoted or hinged at 10. Both the hook and the lever are provided with a lip or catch 11, which catches are adapted to engage each other, as represented. When in this position, a spring 12, fastened in the bottom of the slot or recess 13 in the iron 8, presses the hook in a manner to keep the catch 11 in engagement. A notch or shoulder 14 is preferably provided on the hook to furnish a bearing for the free end of the spring; but the special form of the spring and its bearing are unessential.

In order to hitch a harnessed animal to the singletree or to attach the latter to a doubletree the locking-lever is moved by means of its handle 15 to the position indicated by dotted lines. This disengages the catches 11 and permits the hook to be moved to the position shown by dotted lines, in readiness to receive the tug iron or ring. The hook is locked by moving it and the locking-lever so that they engage each other by means of catches 11 or similar devices, the spring acting to hold it locked, as before stated.

The locking-lever is shaped to conform, when closed, to the end of the iron 8, being held in a recess in the latter, so as to be free from any liability of being caught by passing objects. Its handle 15 is curved rearwardly, as shown, that it may be readily grasped when necessary, and being located immediately in the rear of the iron 8 it is protected from opening by accidental blows; but should the hook become accidentally unlocked it would still hold the tug with ordinary security, though the draft would be all thrown upon its hinge-pivot, this ordinarily being sustained by said pivot in co-operation with the pivot of the lock, as will be understood. This makes a strong and safe construction and one that can be operated with ease and certainty. The tug-hook when in use has not the free end which in the common form is liable to catch on bushes or other obstructions. The hook, also, can be made without the customary twist given to such device, and the tug-eye can be engaged with it with more ease in case the tug is taut.

The several details may be varied by mechanics without substantially departing from the invention, which is herein illustrated in the form preferred.

Having described my invention, what I desire to secure by Letters Patent is—

1. The combination of the slotted iron adapted to be secured to the end of the single or double tree, the hook hinged between the walls of the slot, and a locking-lever also hinged between the same, its hinge or pivot being in line with the pivot of the hook and with the body of the whiffletree and outside of said hook-pivot, the lever being adapted to move on its hinge or pivot to lock the hook and having a handle lying behind said iron and its body in the slot when the hook is locked, substantially as described.

2. In combination, the iron adapted to be secured to a single or double tree, having a slot across one end and side, a hook hinged or pivoted in the side slot, and a locking-lever hinged or pivoted in the end slot outside the hook-pivot and in line with the same and with the body of the whiffletree and conforming in a locked position to the end of the iron, the hook and lever being provided with shoulders or catches adapted to engage each other and lock the hook, substantially as described.

3. In combination, the iron adapted to be secured to a whiffletree, having a slot in one side and end, a hook pivoted in the side or front slot and having an exterior notch on its limb opposite the pivot, and a notched lever bent at right angles and pivoted in the slot in line with the hinge-pivot and with the body of the whiffletree, its body lying, when engaged with the hook, in the end slot and its outer free end extending along close to the back of the iron and toward the whiffletree, substantially as described.

4. In combination with an iron adapted to be secured to a whiffletree, said iron being slotted in front and at its end, a hook pivoted in the front slot and having an exterior notch on its free limb and a locking-lever pivoted in the slot and provided with a notch to engage the hook-notch, the notched ends of the hook and lever lying entirely in the slot when their notches are engaged, substantially as described.

In testimony whereof I have signed this specification in the presence of two subscribing witnesses.

HENRY L. MOYER.

Witnesses:
V. E. CHAPIN,
F. J. POST.